United States Patent
Platz et al.

[15] 3,654,465
[45] Apr. 4, 1972

[54] SCANNING APPARATUS FOR ISOTOPE DIAGNOSIS

[72] Inventors: Winfried Platz, Erlangen; Erich Kampf, Nurnberg, both of Germany

[73] Assignee: Siemens Aktiengesellschaft, Erlangen, Germany

[22] Filed: May 26, 1969

[21] Appl. No.: 869,406

[30] Foreign Application Priority Data

June 1, 1968 Germany..................G 67 52 486.1

[52] U.S. Cl............................................250/71.5 S, 250/54
[51] Int. Cl.........................................................G01t 1/20
[58] Field of Search...............250/71.5 S, 54, 52, 53, 106

[56] References Cited

UNITED STATES PATENTS 3,233,102  2/1966  Packard.................................250/71.5

FOREIGN PATENTS OR APPLICATIONS 1,023,826  2/1958  Germany...........................250/71.5 S

*Primary Examiner*—James W. Lawrence
*Assistant Examiner*—A. L. Birch
*Attorney*—Richards & Geier

[57]  ABSTRACT

An apparatus for isotope diagnosis to determine the distribution of radioactive substances in a body. The apparatus incorporates two radiation detectors connected for synchronous scanning of an examination zone of the body, one of the detectors being mounted in an accessory accessary which is adapted for connection to the housing of the other detector.

1 Claims, 1 Drawing Figure

PATENTED APR 4 1972
3,654,465
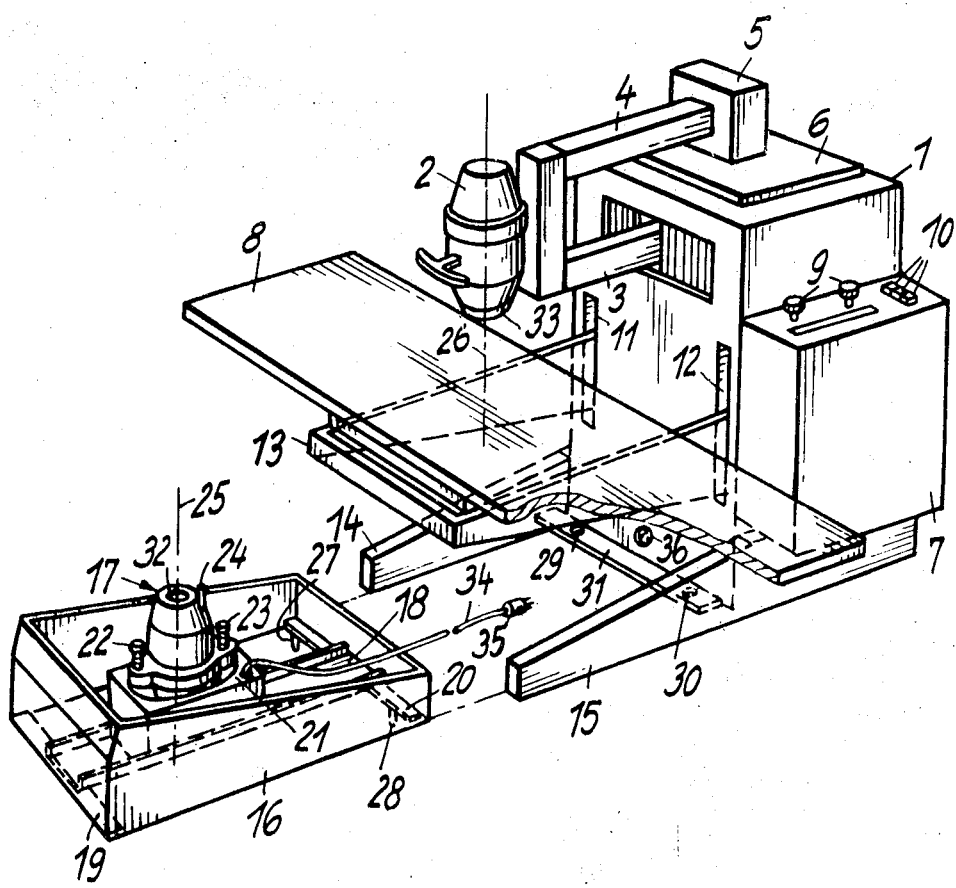
INVENTORS:
W. Platz and E. Kämpf
BY Richards & Geier
ATTORNEYS

SCANNING APPARATUS FOR ISOTOPE DIAGNOSIS

BACKGROUND OF INVENTION

1. Field of Invention

The present invention relates to an apparatus for isotope diagnosis to determine the distribution of radioactive substances in a body by simultaneous synchronous scanning of an examination zone using two radiation detectors directed onto the zone from different directions.

2. Description of Prior Art

In isotope diagnostic techniques, the method of scanning a body containing a radiation emissive material from different sides and at different angles simultaneously using a radiation detector in each case, and of subtracting the various measured results from one another, has found wide acceptance. From the differences in the measurements obtained asymmetries which are due to the asymmetric distribution of the radioactive substances, can be determined. For example, it is possible in respect of tumours to determine how deeply they are located in the body. By adding the signals from both the radiation detectors, because of the consequent increase in the pulse rate received, it is possible to select either a higher scanning rate or a better image quality. The separate measurements obtained from the two detectors may be advantageous because different pictures can then be obtained simultaneously and time saved.

In kinds of apparatus known to the applicants the two detectors are connected to one another to form an integral structure, in order to maintain synchronous movements, so that an elaborate and expensive construction results. An apparatus known to the applicants, having only one detector, may subsequently be modified by equiping it with a second detector but such modification is to say the least extremely laborious because extensive rebuilding operations are required. Also, during the time taken to modify such an apparatus, which time may be quite substantial, the apparatus is out of service.

The main object of the present invention is to provide an apparatus for isotope diagnosis in which the aforesaid disadvantages are minimized or eliminated.

SUMMARY OF INVENTION

According to the present invention there is provided an apparatus for isotope diagnosis to determine the distribution of radioactive substances in a body, said apparatus comprising:
a. a first housing;
b. a first radiation detector defining a radiation entry aperture mounted on said housing for scanning movement longitudinally and transversely of said housing;
c. drive means in said housing for effecting said scanning movement;
d. a diagnostic table mounted on said housing for movement towards and away from said detector perpendicularly to the plane of detector movement;
e. a second housing adapted to be connected to the first housing;
f. a second radiation detector defining a second radiation entry aperture mounted on said second housing for scanning movement identical to that of said first detector and on a side of said table opposite to that of the first detector; and
g. second drive means on said second housing for effecting the scanning movement of said second detector, the second drive means being electrically connected to the first drive means for control simultaneously and synchronously with said first drive means such that the radiation entry apertures in said respective detectors align.

BRIEF DESCRIPTION OF DRAWING

In order that the invention may be more fully understood an embodiment in accordance therewith will now be described by way of example with reference to the accompanying drawing which shows a perspective view of an apparatus for isotope diagnosis.

DESCRIPTION OF PREFERRED EMBODIMENT

The apparatus illustrated comprises a housing 1 in which a drive control system for producing a scanning movement of a radiation detector 2, is housed. The scanning movement of the detector 2 is longitudinally and transversely of the housing 1. The detector 2 includes a shielded radiation measuring device disposed therein and masked off to cover only a small area of a body and defines a radiation entry aperture 33, which, during scanning, is directed towards the zone to be examined of the body containing radiation emmisive material. The detector 2, is connected to its scanning drive system through an arm 3. A recording head 5 is connected to the detector 2 through an arm 4, which recording head records the measurements obtained by the detector 2 on a plate 6 in the conventional way in the form of a trace produced on a paper strip.

In a lateral extension 7 of the housing 1 is disposed a drive system for effecting raising and lowering of a diagnostic table 8 located beneath the detector 2. This latter drive system is controlled externally, as by knobs 9 and push-buttons 10 for example. The table 8 is supported by and rests upon a carrier 13, the arms of which extend into the housing through slots 11 and 12. The carrier can be moved in the slots 11 and 12 by the drive system which may include an appropriate motor. Parallel to the arms of the carrier 13, and at the bottom end of the housing 1, housing support beams 14 and 15 project from and are secured to the housing 1, so that the entire apparatus, despite the high weight of the detector 2 and the fact that the table 8 is mounted in the upper part of the front wall of the housing 1, has adequate stability.

An additional radiation detector 17 of the same type as the detector 2 defines a radiation entry aperture, 32 and is arranged in an accessory housing 16.

The detector 17 is carried by a mounting 21 which is mounted on a rail 18 supported on rails 19 and 20. The detector 17 can be displaced, longitudinally along the rail 18 and, with the rail 18 transversely along the rails 19 and 20. Thus, like the detector 2, the additional detector 17 may be displaced in two mutually perpendicular horizontal coordinate directions, i.e., longitudinally and transversely of the housing 16. Arranged in the mounting 21 for the detector 17, are threaded drive spindles 22 and 23 coupled to a drive system in the mounting 21. By means of the spindles and drive system the detector 17 can be vertically adjusted to correspond with the adjustment of the table 8. The raising and lowering of the detector 17 is coupled with the movements of the table by a sensing finger 24 mounted on the detector 17 and projecting beyond its radiation entry aperture 32. The finger 24 controls the drive to the spindles 22, 23. During an upward movement of the detector 17, when the finger 24 meets the table 8, a switch is operated which causes the upward movement of the detector 17 to cease and when the table 8 is moved upwardly by the carrier 13 the switch becomes operative again and the detector 17 continues its upward movement. On the other hand, when the table is lowered and meets the finger 24, another switch position is reached and the detector 17 is caused to move downwardly by the operation of the spindle drive system.

The mounting 21 also contains drive means including motors which control the movement of the detector 17 along the rail 18 and along the rails 19,20. Also, an electrical control unit is contained in the mounting 21, by means of which the scanning movement of the probe 17 is sychronised with that of the detector 2 so that the axes 25 and 26 of the respective detectors are aligned with each other and are maintained in alignment during scanning.

In order to prepare the apparatus for operation the housing 16 is inserted between the beams 14 and 15, after the beams have been fitted to the housing 1. The detector 17 is connected to the drive and control elements for the detector 2 in the housing 1 as by a lead 34 carrying a plug 35 which is placed in a socket 36 in the housing 1. The housing 16 is then pushed fully in and slightly raised so that male elements in the form of pins 27 and 28 on the housing 16 engage in female elements in the form of holes 29,30 in an extension 31, fitted between the beams 14, 15 at the bottom of the front of the housing 1.

Thus, a simple isotope diagnostic apparatus comprising the detector 2, can be fitted easily and rapidly with a second detector 17, to form a scanner having two detectors 2 and 17 whose sensing apertures 32, 33 face one another.

We claim:
1. An apparatus for isotope diagnosis to determine the distribution of radioactive substances in a body, said apparatus comprising:
   a. a first housing;
   b. a first radiation detector defining a radiation entry aperture and mounted on said first housing for a scanning movement longitudinally and transversely of said first housing;
   c. drive means in said first housing for effecting said scanning movement;
   d. a diagnostic table mounted on said first housing;
   e. means for moving said table towards and away from said first detector perpendicularly to the plane of detector movement;
   f. a second housing adapted to be connected to said first housing and to be slid beneath said table;
   g. a second radiation detector defining a second radiation entry aperture and mounted on said second housing for a scanning movement identical to that of said first detector and on a side of said table opposite to that of the first detector, said second detector having a sensing finger projecting beyond its radiation entry aperture;
   h. means connected with said second detector for raising and lowering said second detector relatively to said second housing; and
   i. second drive means on said second housing for effecting the scanning movement of said second detector, said sensing finger of the second detector being connected to said means for raising and lowering said second detector and to said means for moving said table, whereby the movements of said second detector are coupled with the movements of said table, said second drive means being electrically connected with said first drive means for a control simultaneously and synchronously with said first drive means such that the radiation entry apertures in said detectors align.

* * * * *